(12) United States Patent
Shih et al.

(10) Patent No.: US 11,617,114 B2
(45) Date of Patent: Mar. 28, 2023

(54) METHOD OF CELL RESELECTION IN NON-PUBLIC NETWORK AND RELATED DEVICE

(71) Applicant: FG Innovation Company Limited, Tuen Mun (HK)

(72) Inventors: Mei-Ju Shih, Taipei (TW); Yung-Lan Tseng, Taipei (TW); Hung-Chen Chen, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/351,672

(22) Filed: Jun. 18, 2021

(65) Prior Publication Data

US 2021/0400552 A1 Dec. 23, 2021

Related U.S. Application Data

(60) Provisional application No. 63/041,775, filed on Jun. 19, 2020.

(51) Int. Cl.
*H04W 36/08* (2009.01)
*H04W 48/16* (2009.01)
(Continued)

(52) U.S. Cl.
CPC .......... *H04W 36/08* (2013.01); *H04W 48/16* (2013.01); *H04W 76/11* (2018.02); *H04W 88/14* (2013.01); *H04W 84/042* (2013.01)

(58) Field of Classification Search
CPC ..... H04W 36/08; H04W 48/16; H04W 76/11; H04W 88/14; H04W 84/042; H04W 48/02; H04W 48/12; H04W 48/20
See application file for complete search history.

(56) References Cited

U.S. PATENT DOCUMENTS

2019/0394825 A1 12/2019 Byun et al.
2021/0227451 A1* 7/2021 Babaei ................. H04W 48/10

FOREIGN PATENT DOCUMENTS

WO 2020/091648 A1 5/2020
WO 2020/122247 A1 6/2020

OTHER PUBLICATIONS

Huawei, HiSilicon, "Correction of TS 38.304 to introduce IAB", R2-2002117, 3GPP TSG-RAN WG2 Meeting #109 electronic, Feb. 24-Mar. 6, 2020.
(Continued)

*Primary Examiner* — Diane D Mizrahi
(74) *Attorney, Agent, or Firm* — ScienBiziP, P.C.

(57) ABSTRACT

A method of cell reselection in a non-public network (NPN) for a user equipment (UE) is provided. The method includes receiving, from a first cell via a first System Information Block 1 (SIB1), a first network identity associated with a first indication, receiving, from a second cell via a second SIB1, a second network identity associated with a second indication, selecting one of the first network identity and the second network identity, determining whether the first indication is present and whether the first network identity is selected by the UE, determining the first cell as barred for the cell reselection when the first indication is present, but the first network identity is not selected by the UE, and determining the first cell as a candidate cell for the cell reselection when the first indication is present and the first network identity is selected by the UE.

20 Claims, 5 Drawing Sheets

(51) Int. Cl.
 *H04W 76/11* (2018.01)
 *H04W 88/14* (2009.01)
 *H04W 84/04* (2009.01)

(56) References Cited

OTHER PUBLICATIONS

Kyocera, "IAB support in NPN deployment", R2-2003346, 3GPP TSG-RAN WG2 #109bis-e, Online, Apr. 20-30, 2020.
3GPP TS 38.401, "3rd Generation Partnership Project; Technical Specification Group Radio Access Network; NG-RAN; Architecture description (Release 16)", V16.1 0 (Mar. 2020).
3GPP TS 23.501, "3rd Generation Partnership Project; Technical Specification Group Services and System Aspects; System architecture for the 5G System (5GS); Stage 2 (Release 16)", V16.4.0 (Mar. 2020).

* cited by examiner

METHOD OF CELL RESELECTION IN NON-PUBLIC NETWORK AND RELATED DEVICE

CROSS-REFERENCE TO RELATED APPLICATION(S)

The present disclosure claims the benefit of and priority to U.S. Provisional Patent Application Ser. No. 63/041,775 filed on Jun. 19, 2020, entitled "METHOD AND APPARATUS FOR THE SUPPORT OF INTEGRATED ACCESS AND BACKHAUL IN NON-PUBLIC NETWORK," (hereinafter referred to as "the '775 provisional"). The disclosure of the '775 provisional is hereby incorporated fully by reference into the present disclosure.

FIELD

The present disclosure is generally related to wireless communications and, more specifically, to a method of cell reselection in a non-public network (NPN) and a related device.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability for optimizing the network services and types and accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure provides a method of cell reselection in a non-public network (NPN) and a related device.

According to an aspect of the present disclosure, a method of cell reselection in an NPN for a user equipment (UE) is provided. The method includes receiving, from a first cell via a first System Information Block 1 (SIB1), a first information element including a first network identity associated with a first indication, receiving, from a second cell via a second SIB1, a second information element including a second network identity associated with a second indication, selecting one of the first network identity and the second network identity, determining whether the first indication is present in the first information element and whether the first network identity is selected by the UE, determining the first cell as barred for the cell reselection when the first indication is present, but the first network identity is not selected by the UE, and determining the first cell as a candidate cell for the cell reselection when the first indication is present and the first network identity is selected by the UE, wherein the first indication is used for indicating whether the first cell supports integrated access and backhaul (IAB) functionality, and the first network identity is different from the second network identity.

According to another aspect of the present disclosure, a UE for performing a cell reselection in an NPN is provided. The UE includes a processor configured to execute a computer-executable program, and a memory coupled to the processor and configured to store the computer-executable program, wherein the computer-executable program instructs the processor to perform the above-described method of performing cell reselection in an NPN.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

The following disclosure contains specific information pertaining to exemplary implementations in the present disclosure. The drawings and their accompanying detailed disclosure are directed to exemplary implementations. However, the present disclosure is not limited to these exemplary implementations. Other variations and implementations of the present disclosure will occur to those skilled in the art. Unless noted otherwise, like or corresponding elements in the drawings may be indicated by like or corresponding reference numerals. Moreover, the drawings and illustrations are generally not to scale and are not intended to correspond to actual relative dimensions.

For consistency and ease of understanding, like features are identified (although, in some examples, not shown) by reference designators in the exemplary drawings. However, the features in different implementations may be different in other respects, and therefore shall not be narrowly confined to what is shown in the drawings.

The phrases "in one implementation," and "in some implementations," may each refer to one or more of the same or different implementations. The term "coupled" is defined as connected, whether directly or indirectly via intervening components, and is not necessarily limited to physical connections. The term "comprising" may mean "including, but not necessarily limited to" and specifically indicate open-ended inclusion or membership in the disclosed combination, group, series, and equivalents.

The term "and/or" herein is only an association relationship for describing associated objects and represents that three relationships may exist, for example, A and/or B may represent that: A exists alone, A and B exist at the same time, and B exists alone. "A and/or B and/or C" may represent that at least one of A, B, and C exists, A and B exist at the same time, A and C exist at the same time, B and C exist at the same time, and A, B and C exist at the same time. Besides, the character "/" used herein generally represents that the former and latter associated objects are in an "or" relationship.

Additionally, any two or more of the following paragraphs, (sub)-bullets, points, actions, behaviors, terms, alternatives, examples, or claims in the present disclosure may be combined logically, reasonably, and properly to form a specific method. Any sentence, paragraph, (sub)-bullet, point, action, behavior, term, or claim in the present disclosure may be implemented independently and separately to form a specific method. Dependency, e.g., "based on", "more specifically", "preferably", "In one embodiment", "In one implementation", "In one alternative", in the present disclosure may refer to just one possible example that would not restrict the specific method.

For a non-limiting explanation, specific details, such as functional entities, techniques, protocols, standards, and the like, are set forth for providing an understanding of the disclosed technology. In other examples, detailed disclosure of well-known methods, technologies, systems, and architectures are omitted so as not to obscure the present disclosure with unnecessary details.

Persons skilled in the art will recognize that any disclosed network function(s) or algorithm(s) may be implemented by hardware, software, or a combination of software and hardware. Disclosed functions may correspond to modules that may be software, hardware, firmware, or any combination thereof. The software implementation may comprise computer-executable instructions stored on a computer-readable medium, such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or using one or more Digital Signal Processors (DSPs). Although some of the disclosed implementations are directed to software installed and executing on computer hardware, nevertheless, alternative implementations as firmware or as hardware or combination of hardware and software are well within the scope of the present disclosure.

The computer-readable medium may include, but may not be limited to, Random Access Memory (RAM), Read-Only Memory (ROM), Erasable Programmable Read-Only Memory (EPROM), Electrically Erasable Programmable Read-Only Memory (EEPROM), flash memory, Compact Disc (CD) Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a New Radio (NR) system) may typically include at least one base station (BS), at least one UE, and one or more optional network elements that provide connection with a network. The UE may communicate with the network (e.g., a Core Network (CN), an Evolved Packet Core (EPC) network, an Evolved Universal Terrestrial Radio Access Network (E-UTRAN), a Next-Generation Core (NGC), a 5G Core (5GC), or an internet) via a Radio Access Network (RAN) established by one or more BSs.

A UE according to the present disclosure may include, but is not limited to, a mobile station, a mobile terminal or device, or a user communication radio terminal. For example, a UE may be a portable radio equipment that includes, but is not limited to, a mobile phone, a tablet, a wearable device, a sensor, or a Personal Digital Assistant (PDA) with wireless communication capability. The UE may be configured to receive and transmit signals over an air interface to one or more cells in a RAN.

A BS may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) RAN (GERAN), a next-generation eNB (ng-eNB) as in an Evolved Universal Terrestrial Radio Access (E-UTRA) BS in connection with the 5GC, a next-generation Node B (gNB) as in the 5G-RAN (or in the 5G Access Network (5G-AN)), and any other apparatus capable of controlling radio communication and managing radio resources within a cell. The BS may connect to serve the one or more UEs via a radio interface to the network.

A BS may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) according to basic Wideband-Code Division Multiple Access (W-CDMA), High-Speed Packet Access (HSPA), LTE, LTE-A, enhanced LTE (eLTE), NR (often referred to as 5G), and/or LTE-A Pro. However, the scope of the present disclosure is not limited to these protocols.

The BS may be operable to provide radio coverage to a specific geographical area using a plurality of cells forming the RAN. The BS may support the operations of the cells. Each cell may be operable to provide services to at least one UE within its radio coverage. More specifically, each cell (often referred to as a serving cell) may provide services to serve one or more UEs within its radio coverage (e.g., each cell schedules the downlink (DL) and optionally UL resources to at least one UE within its radio coverage for DL and optionally UL packet transmissions). The BS may communicate with one or more UEs in the radio communication system via the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be called as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the 3rd Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are applied for NR: (1) low-density parity-check (LDPC) code and (2) polar code. The coding scheme adaption may be configured based on the channel conditions and/or the service applications.

Moreover, in a transmission time interval of a single NR frame, at least DL transmission data, a guard period, and UL transmission data should be included. The respective portions of the DL transmission data, the guard period, and the UL transmission data should also be configurable, for example, based on the network dynamics of NR. An SL resource may also be provided via an NR frame to support ProSe services or V2X services.

In order to fulfill the low latency and high reliability requirements for the vertical industry and support the 5G Local Area Network (LAN) type service, a dedicated wireless network (e.g., private network) attracts attention to be included in the next-generation cellular network.

The private network (e.g., non-public network (NPN)) may support the vertical industry and LAN services. The private network may be classified into a single non-public network (SNPN) and a public network integrated non-public network (PNI-NPN).

The 5G system is enhanced to support NPN. Two network identifies are applied for NPN: Network Identifier (NID) and Closed Access Group (CAG) ID for identifying NPN. 5G Radio Access Network (RAN) may also implement NPN by enhancing features such as NPN identification, discovery, selection/reselection, access control, and mobility restrictions.

One of the potential technologies targeted to enable future cellular network deployment scenarios and applications is the support for wireless backhaul and relay links enabling flexible and very dense deployment of cells (e.g., NR cells) without the need for densifying the transport network proportionately. The wireless backhaul and relay may utilize the massive Multi-input Multi-output (MIMO) or multi-beam systems. The benefits of integrated access and backhaul (IAB) are crucial during network rollout and the initial network growth phase. To leverage these benefits, IAB needs to be available when NR rollout occurs. Enabling IAB functionality in NPN deployments is considered as a possible scenario for future cellular networks.

In an NPN scenario, a UE may be configured as "a UE in SNPN access mode" or "a UE in non-SNPN access mode (e.g., a UE not in SNPN access mode)" by the NAS layer of the UE, by the camped/serving cell, or by pre-configuration. A cell may be configured as "an SNPN cell", "a CAG cell", "a public land mobile network (PLMN) cell", "a cell supporting at least SNPN deployments", "a cell supporting at least PNI-NPN deployments", "a cell supporting at least PLMN deployments", "a cell supporting at least SNPN and PNI-NPN deployments", "a cell supporting at least SNPN and PLMN deployments", "a cell supporting at least PNI-NPN and PLMN deployments", or "a cell supporting SNPN, PNI-NPN, and PLMN deployments".

In an IAB scenario, a UE may be configured as "a UE with IAB functionality" and "a UE without IAB functionality". A cell may be configured as "a cell with IAB functionality" and "a cell without IAB functionality".

Multiple PLMNs may operate on an unlicensed spectrum. Multiple PLMNs may share the same unlicensed carrier. The PLMNs may be public or private. Public PLMNs may be (but may not be limited to) the operators or virtual operators, which provides radio services to the public subscribers. Public PLMNs may own a licensed spectrum and support the RAT on the licensed spectrum as well. Private PLMNs may be (but may not be limited to) the micro-operators, factories, or enterprises, which provides radio services to its private users (e.g., employees or machines). Public PLMNs may support more deployment scenarios (e.g., carrier aggregation (CA) between licensed band NR (e.g., PCell) and NR-U (e.g., SCell), dual connectivity (DC) between licensed band LTE (e.g., PCell) and NR-U (e.g., PSCell), stand-alone NR-U, an NR cell with DL in unlicensed band and UL in licensed band, dual connectivity between licensed band NR (e.g., PCell) and NR-U (e.g., PSCell)). On the other hand, private PLMNs mainly support (but may not be limited to) the stand-alone unlicensed RAT (e.g., stand-alone NR-U).

In this disclosure, a mechanism for a UE supporting IAB and/or NPN to perform cell (re)selection to select/camp on a cell supporting the corresponding IAB and/or NPN is disclosed.

IAB Technology

IAB may enable wireless relaying in a RAN (e.g., a Next Generation RAN (NG-RAN)). The relaying node, referred to as an IAB node, may support access and backhaul via a RAT (e.g., NR, LTE connected to a 5G Core (5GC), LTE connected to EPC). In this disclosure, the term "NR" is an example for illustration. However, the RAT applied for IAB may not be limited to NR. The terminating node of NR backhauling on the network side may be referred to as the IAB-donor, which represents a base station (e.g., gNB if the RAT is NR, eNB if the RAT is LTE connected to EPC, ng-eNB if the RAT is LTE connected to 5GC) with additional functionality to support IAB. Backhauling may occur via a single or multiple hops. The IAB architecture is illustrated in FIG. 1A and FIG. 1B.

Figure 1A:
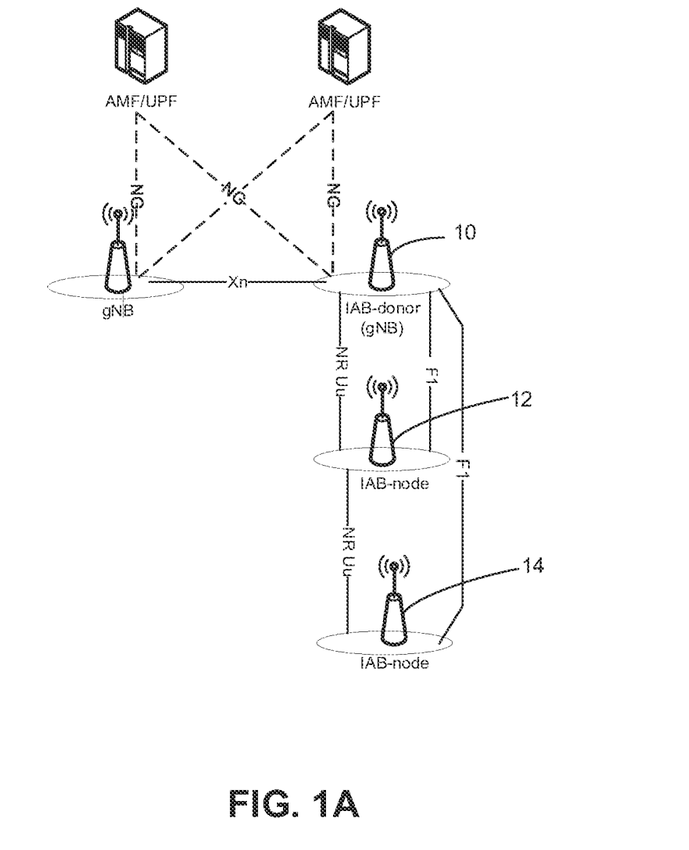
FIG. 1A is a schematic diagram illustrating an integrated access and backhaul (IAB) architecture including IAB-nodes with a standalone (SA) mode, according to an implementation of the present disclosure.

FIG. 1A is a schematic diagram illustrating an IAB architecture including IAB-nodes with a standalone (SA) mode, according to an implementation of the present disclosure. In the NR SA mode, the IAB-donor 10 may be a gNB that supports the IAB functionality. A network node (e.g., a UE, the IAB-node 12, or the IAB-node 14) may connect to 5GC (e.g., Access and Mobility management Function (AMF)/User Plane Function (UPF)) via the IAB-donor 10.

Figure 1B:
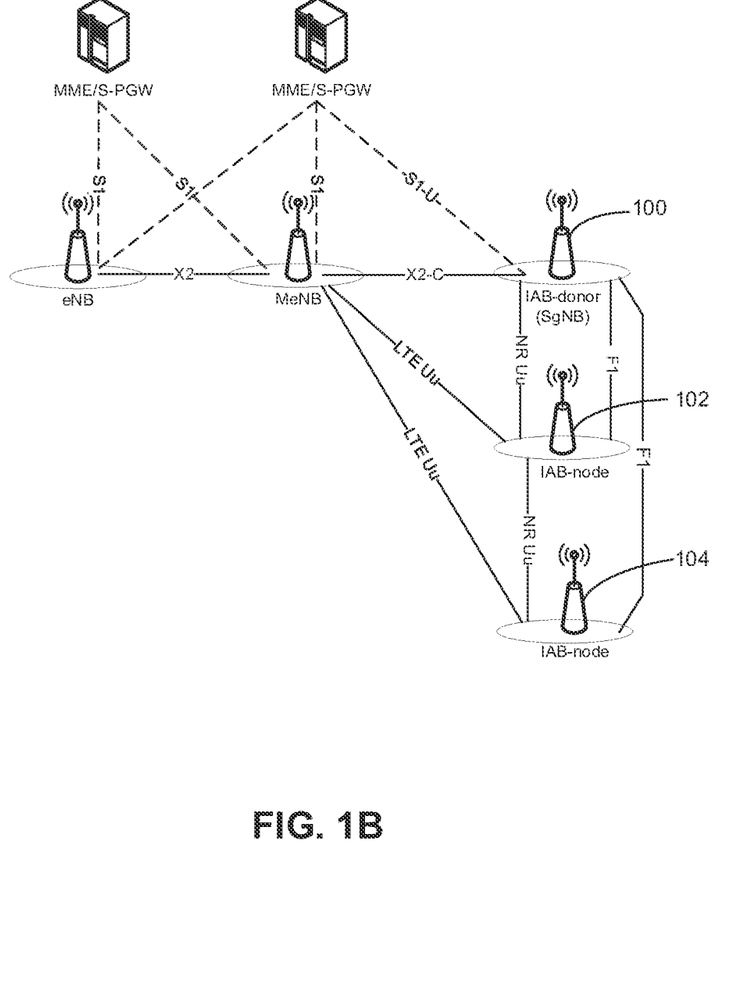
FIG. 1B is a schematic diagram illustrating an IAB architecture including IAB-nodes with an E-UTRA-NR Dual Connectivity (EN-DC) mode, according to an implementation of the present disclosure.

FIG. 1B is a schematic diagram illustrating an IAB architecture including IAB-nodes with an E-UTRA-NR Dual Connectivity (EN-DC) mode, according to an implementation of the present disclosure. In one example, in EN-DC mode, the IAB-donor 100 may be a Secondary gNB (SgNB) with IAB functionality. Alternatively, the IAB-donor 100 may be a Master eNB (MeNB) that supports the IAB functionality. A network node (e.g., a UE, the IAB-node 102, or the IAB-node 104) may connect to EPC (e.g., Mobility Management Entity (MME)/Serving and Packet Data Network Gateway (S-PGW)) via the IAB-donor 100. Alternatively, a network node (e.g., a UE, the IAB-node 102 or the IAB-node 104) may connect to 5GC (e.g., AMF/UPF) via the IAB-donor 100 (e.g., in NG-RAN E-UTRA-NR Dual Connectivity (NGEN-DC) mode).

In another example, in NR-NR Dual Connectivity (NR-DC) mode, the IAB-donor may be a Master gNB (MgNB) that supports the IAB functionality. Alternatively, the IAB-donor may be a SgNB that supports the IAB functionality.

A network node (e.g., a UE or an IAB-node) may connect to 5GC (e.g., AMF/UPF) via the IAB-donor.

In other examples, in NR-E-UTRA Dual Connectivity (NE-DC) mode, the IAB-donor may be a MgNB that supports the IAB functionality. Alternatively, the IAB-donor may be a SeNB that supports the IAB functionality. A network node (e.g., a UE or an IAB-node) may connect to 5GC (e.g., AMF/UPF) via the IAB-donor.

Figure 2:
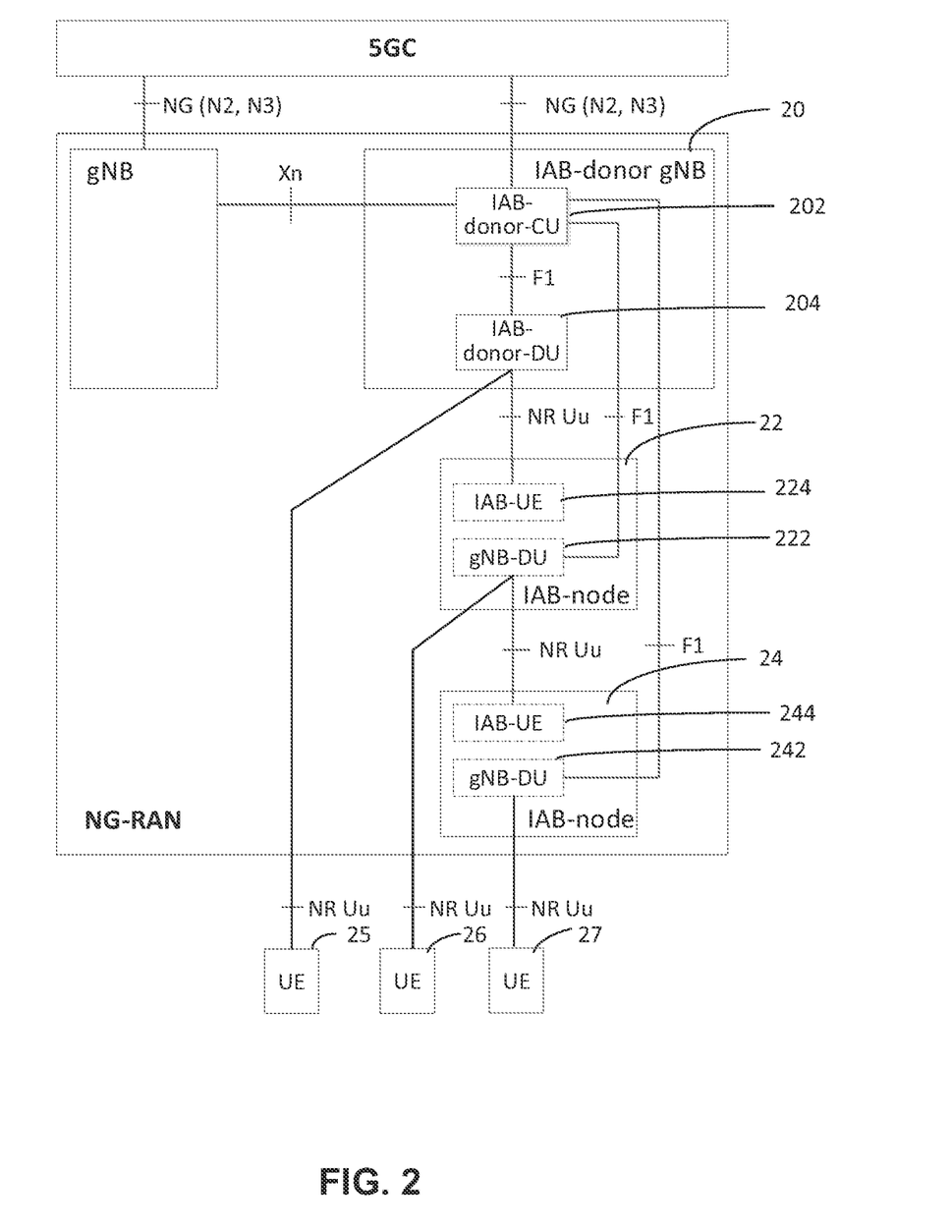
FIG. 2 is a schematic diagram illustrating an IAB architecture with a 5G System (5GS), according to an implementation of the present disclosure.

FIG. 2 is a schematic diagram illustrating an IAB architecture with a 5G System (5GS), according to an implementation of the present disclosure. The IAB-nodes (e.g., IAB-donor gNB 20 and IAB-nodes 22 and 24) may support gNB Distributed Unit (gNB-DU) functionality (e.g., IAB-donor-DU 204, gNB-DU 222 and gNB-DU 242) to terminate the NR access interface to the UEs 25-27 and next-hop IAB-nodes (e.g., the IAB-nodes 22 and 24), and to terminate the F1 protocol to the gNB Central Unit (gNB-CU) functionality (e.g., IAB-donor-CU 202 of the IAB-donor gNB 20). The IAB-donor-DU 204, gNB-DU 222 and gNB-DU 242 are also referred to as IAB-DU.

As illustrated in FIG. 2, the IAB architecture with two backhaul hops when connecting to 5GC is disclosed. For example, the gNB-DUs 222 and 242 of the IAB-nodes 22 and 24 are responsible for providing NR Uu access to the UEs 26 and 27 and child IAB-nodes (e.g., the IAB-node 24 is a child IAB-node for the IAB-node 22). The gNB-CU functionality (e.g., IAB-donor-CU 202) may be deployed on the IAB-donor gNB 20, which controls the gNB-DUs 222 and 242 of the IAB-nodes 22 and 24 via the F1 interface. The IAB-nodes 22 and 24 may be considered as normal gNBs to the UEs 26-27, and other IAB-nodes (e.g., IAB-donor gNB 20) may allow the UEs 25-27 to connect to the 5GC (or EPC).

In addition to the gNB-DU functionality, the IAB-nodes 22 and 24 may support a subset of the UE functionality (e.g., IAB-UEs 224 and 244), which may be referred to as IAB Mobile-Termination (IAB-MT) and each includes a physical layer, a layer-2, a Radio Resource Control (RRC) and Non-Access Stratum (NAS) functionality to connect to the gNB-DU (e.g., IAB-donor-DU 204, gNB-DU 222 and gNB-DU 242) of another IAB-node (e.g., IAB-nodes 22 and 24) or the IAB-donor (e.g., IAB-donor gNB 20), to connect to the gNB-CU (e.g., IAB-donor-CU 202) of the IAB-donor (e.g., IAB-donor gNB 20), and to the core network.

All functions for a UE may be used as an IAB-MT. For example, the IAB-MT may access the network using either one network node or using two different network nodes with EN-DC and NR-DC modes. In (NG)EN-DC mode, the backhauling traffic over the E-UTRA radio interface may or may not be supported.

The IAB-node may access the network by using either SA-mode or EN-DC mode, but may not be limited to. For example, the IAB-node may access the network by using (NG)EN-DC, NR-DC, or NE-DC mode. In EN-DC mode, the IAB-node may connect via E-UTRA to a MeNB (or a SgNB), and the IAB-donor terminates X2-C as SgNB.

In EN-DC mode, a secondary node (SN) may broadcast system information to allow IAB-MT to access the SN.

It is noted that, as illustrated in FIG. 2, the IAB node may enable wireless in-band and out-of-band relaying of NR Uu access traffic via NR Uu backhaul links. The Uu backhaul links may exist between the IAB-node and a gNB referred to as an IAB-donor, or between the IAB-node and another IAB-node. The part of the IAB node that supports the (Uu) interface towards the IAB-donor or another parent IAB-node (for managing the backhaul connectivity with either PLMN or SNPN with which the IAB node is registered) is referred to as an IAB-UE. The IAB-UE function behaves as a UE, and reuses UE procedures to connect to: (1) the gNB-DU on a parent IAB-node or IAB-donor for access and backhauling, (2) the gNB-CU on the IAB-donor via RRC for control of the access and backhaul link, (3) 5GC (e.g. AMF) via NAS, and (4) Operations, Administration, and Maintenance (OAM) system via a Packet Data Unit (PDU) session or Packet Data Network (PDN) connection.

The IAB-UE may connect to 5GC over NR (with SA mode, NR-DC or NGEN-DC mode). Alternatively, the IAB-UE may connect to an EPC (with EN-DC mode) (e.g., via the SgNB) network. The UE served by the IAB-node may be operated in the same or different modes from the IAB-node. For example, the IAB-donor may be a gNB with IAB functionality if the IAB-UE connects to the 5GC via NR (with SA mode). For another example, the IAB-donor may be a SgNB with IAB functionality in EN-DC mode if the IAB-UE connects to the EPC via EN-DC mode.

On the other hand, a UE may operate in PLMN access mode (e.g., not in SNPN access mode) or in SNPN access mode. The UE may determine whether it is in PLMN access mode or in SNPN access mode based on at least one of the following conditions:

Condition 1: The UE (e.g., the NAS entity of the UE) may determine based on NAS (pre)configuration;

Condition 2: The UE may be (pre)configured to be in PLMN access mode (e.g., not in SNPN access mode) or in SNPN access mode;

Condition 3: The UE may change from PLMN access mode (e.g., not in SNPN access mode) to SNPN access mode by the UE (e.g., the NAS entity of the UE) or by the serving/camped cell; and Condition 4: The UE may change from SNPN access mode to PLMN access mode (e.g., not SNPN access mode) by the UE (e.g., the NAS entity of the UE) or by the serving/camped cell.

If a UE is in PLMN access mode (or if a UE is not in SNPN access mode), the UE may perform a PLMN selection. For the UE not operating in SNPN access mode (or for the UE operating in PLMN access mode), the UE (e.g., the NAS entity of the UE) may maintain a list of PLMN(s) in priority order. For each (selected/registered) PLMN, the UE (e.g., the NAS entity of the UE) may set the associated RAT(s). The UE (e.g., the AS entity of the UE) may perform a cell measurement for the PLMN selection. The UE (e.g., the AS entity of the UE) may synchronize with a broadcast channel to identify PLMN(s). The UE (e.g., the AS entity of the UE) may search for available PLMN(s). The AS entity of the UE may report the available PLMN(s) to the NAS entity of the UE. The AS entity of UE may report available PLMNs and/or any associated CAG IDs with associated RAT(s) to the NAS entity of the UE based on a request from the NAS entity of the UE or autonomously. The NAS entity of UE may evaluate reports of available PLMNs and any associated CAG IDs from the AS entity of the UE for the PLMN selection. The NAS entity of the UE may maintain a list of equivalent PLMN identities. The NAS entity of the UE may select a PLMN in an automatic manner (e.g., the UE is allowed to select automatically) or in a manual manner (e.g., the UE is not authorized to select automatically but is allowed to select in certain requirements/default or preconfigured conditions) based on the reported available PLMN(s) and/or reported CAG ID(s) and request the AS entity of the UE to select a (suitable/acceptable) cell belonging to this PLMN.

In one example, the NAS entity of the UE may indicate the selected PLMN (or a PLMN ID identifying the selected PLMN) to the AS entity of the UE (e.g., without regarding the available PLMNs). Therefore, the AS entity of the UE may perform a cell (re)selection procedure and select a suitable/acceptable cell belonging to the selected PLMN.

If the UE is in PLMN access mode (or if the UE is not in SNPN access mode), the UE may perform a PLMN selection and a CAG selection. For the UE not operating in SNPN access mode (or for the UE operating in PLMN access mode) and supporting a manual CAG selection (e.g., the UE may (re)select a CAG cell based on the manual CAG selection method by which a PLMN is able to control the UE manually selecting an NPN hosted by this PLMN that the UE may not be authorized to select automatically), the NAS entity of the UE may provide a request to the AS entity of the UE to search for available CAG(s). The AS entity of the UE may search for cells broadcasting CAG ID(s) in System Information Block (SIB) (e.g., in SIB1). The AS entity of the UE may read the Human Readable Network Name (HRNN) for each CAG ID if a cell broadcasting a CAG ID is found. The AS entity of the UE may report CAG ID(s) of the found cell broadcasting the CAG ID together with the associated HRNN and PLMN to the NAS entity of the UE. The NAS entity of the UE may evaluate reports of available CAGs from the AS entity of the UE for the CAG selection. The NAS entity of the UE may select the CAG ID based on the reports of available CAGs. The NAS entity of the UE may inform the selected/registered CAG ID to the AS entity of the UE. A selected CAG is identified by the selected CAG ID, and a registered CAG is identified by the registered CAG ID. The AS entity of the UE may select any acceptable or suitable cell belonging to the selected CAG and transmit an indication (e.g., indicating that an access is possible for the registration procedure) to the NAS entity of the UE.

In one example, the NAS entity of the UE may indicate a selected PLMN (or a PLMN ID identifying the selected PLMN) and/or the selected CAG (or a CAG ID identifying the selected CAG) to the AS entity of the UE (e.g., without regarding the available PLMNs/CAGs). The AS entity of the UE may perform a cell (re)selection procedure and select a suitable/acceptable cell belonging to the selected PLMN and/or the selected CAG.

If the UE is in SNPN access mode, the UE may perform an SNPN selection. For the UE operating in SNPN access mode, the UE (e.g., the NAS entity of the UE) may maintain a list of SNPNs. The NAS entity of the UE may select an SNPN in an automatic or manual manner and request the AS entity of the UE to select a cell belonging to this SNPN. The NAS entity of the UE may evaluate reports of available SNPN(s) from the AS entity of the UE for the SNPN selection. The UE (e.g., the NAS entity of the UE) may set associated RAT(s) for the corresponding SNPN. The UE (e.g., the AS entity of the UE) may search for available SNPNs by considering the cells corresponding to the associated RATs. Alternatively, the UE (e.g., the NAS entity of the UE) may consider the associated RAT for the corresponding SNPN is NR. The UE (e.g., the AS entity of the UE) may search for available SNPNs by considering the NR cells. The UE (e.g., the AS entity of the UE) may perform a cell measurement to support SNPN selection. The UE (e.g., the AS entity of the UE) may synchronize with a broadcast channel to identify SNPNs. The AS entity of the UE may report available SNPNs to the NAS entity of the UE automatically. The AS entity of the UE may report available SNPNs together with associated HRNN (if available) to the NAS entity of the UE based on a request from the NAS entity of the UE. The UE (e.g., the NAS entity of the UE) may select (or register) an SNPN. The NAS entity of the UE may inform the selected (or registered) SNPN ID to the AS entity of the UE. The selected SNPN ID may identify the selected SNPN, and the registered SNPN ID may identify the registered SNPN.

In one example, the NAS entity of the UE may indicate a selected or registered SNPN (e.g., an SNPN ID identifying the selected SNPN or a registered SNPN ID identifying the registered SNPN) to the AS entity of the UE (e.g., without regarding the available SNPNs). The AS entity of the UE may perform a cell (re)selection procedure and select a suitable/acceptable cell belonging to the selected SNPN.

After the AS entity of the UE receives the selected/ registered SNPN ID, the AS entity of the UE may perform a cell (re)selection procedure. Therefore, the UE in RRC_IDLE/RRC_INACTIVE state may camp on a suitable cell as the outcome of the cell (re)selection procedure. During the cell (re)selection procedure, the UE in RRC_IDLE/RRC_INACTIVE state may receive and read the system information (e.g., MIB, SIB1) broadcast by a candidate cell. Based on the system information broadcast by the candidate cell, the UE in RRC_IDLE/RRC_INACTIVE state may determine whether the UE is barred from the corresponding candidate cell. The system information may indicate whether the cell supports the IAB functionality for a corresponding PLMN/SNPN, and/or whether the cell supports the NPN functionality. Different UEs in RRC_IDLE/RRC_INACTIVE state (e.g., whether the UE supports the NPN functionality, whether the UE supports the IAB functionality) may perform different actions according to the system information.

In the present disclosure, information of the system information (e.g., the information being either implicitly or explicitly indicated in the system information) may include (but may not be limited to) a first indication and/or a second indication. The UE may determine whether the cell is barred for the UE or the cell is a candidate cell for cell (re)selection procedure based on the first indication and/or the second indication. The UE may determine whether the cell is barred for the UE or the cell is a candidate cell for cell (re)selection procedure based on the two indications sequentially or parallelly.

In the present disclosure, a UE may refer to (but may not be limited to) a normal UE, an IAB-UE, an IAB-MT, an NPN-capable UE, and/or a non NPN-capable UE. A cell may refer to (but may not be limited) a normal cell, a normal BS, an IAB-node, a gNB-DU, a gNB-CU, an IAB-donor, a cell with IAB functionality being activated to perform IAB related functionality, a cell with IAB functionality not being activated to perform IAB related functionality, a cell without IAB functionality, a cell supporting SNPN, a cell supporting PNI-NPN, and/or a cell supporting at least one of SNPN, PNI-NPN and PLMN.

IAB Support in NPN

The UE may determine whether it is barred from a cell after the UE receiving a first indication (e.g., iab-Support information element (IE)) from the cell. The format of the first indication may be a Boolean indicator, ENUMERATED {true}, or ENUMERATED {true, false}. The UE may read the SIB1 received from the cell and receive the first indication from the cell via SIB1.

The first indication may be associated with an identity and the identity may identify a network (e.g., a first network identity).

In one example, the first indication may be associated with a PLMN ID. The PLMN ID may identify a PLMN and/or a PNI-NPN and/or an SNPN.

For example, the first indication may be included in an IE, where the IE includes information associated with the PLMN ID.

For example, the first indication may be included in an IE (e.g., NPN-IdentityInfo IE), where the IE includes information associated with an NPN (e.g., PNI-NPN, SNPN) and includes at least one NPN identity (e.g., a PNI-NPN ID, an SNPN ID). The PNI-NPN ID may include one PLMN ID and at least one CAG ID. The SNPN identity may include one PLMN ID and at least one NID. At least one NPN identity may identify the NPN. The first indication may be further included in an IE, where the IE includes information associated with a PLMN ID that identifies a PNI-NPN. Alternatively, the first indication may be further included in an IE, where the IE includes information associated with a PLMN ID that identifies an SNPN.

In one example, the first indication may be associated with an SNPN ID. The SNPN ID may identify an SNPN.

For example, the first indication may be included in an IE (e.g., NPN-IdentityInfo IE), where the IE includes information associated with an NPN (e.g., PNI-NPN, SNPN) and includes at least one NPN identity (e.g., a PNI-NPN ID, an SNPN ID). The PNI-NPN ID may include one PLMN ID and at least one CAG ID. The SNPN identity may include one PLMN ID and at least one NID. At least one NPN identity may identify the NPN. In this case, the NPN identity may be the SNPN identity.

In one example, the first indication may be associated with an NID. The NID may identify an SNPN.

For example, the first indication may be included in an IE wherein the IE includes information associated with the NID.

In one example, the first indication may be associated with a PNI-NPN ID. The PNI-NPN ID may identify a PNI-NPN and/or a CAG cell.

For example, the first indication may be included in an IE (e.g., NPN-IdentityInfo IE), where the IE includes information associated with an NPN (e.g., PNI-NPN, SNPN) and includes at least one NPN identity (e.g., a PNI-NPN ID, a SNPN ID). The PNI-NPN ID may include one PLMN ID and at least one CAG ID. The SNPN identity may include one PLMN ID and at least one NID. At least one NPN identity may identify the NPN. In this case, the NPN identity may be the PNI-NPN ID.

In one example, the first indication may be associated with a CAG ID. The CAG ID may identify a PNI-NPN and/or a CAG cell.

For example, the first indication may be included in an IE, where the IE includes information associated with the CAG ID.

The first indication may indicate whether the cell supports the IAB functionality (e.g., the support of IAB-node from the cell's perspective) and/or the cell status for IAB functionality. If the indication is present (or '1' or {true}) in the IE, the cell may support the IAB functionality, and the cell may be considered as a candidate cell for a cell (re)selection procedure from the UE's perspective. If the indication is absent (or '0' or {false}) in the IE, the cell may not support IAB functionality and/or the cell may be considered as a barred cell for IAB-nodes (or IAB-MT) (e.g., a UE supporting IAB) for cell (re)selection procedure from the UE's perspective.

The first indication may indicate whether the cell supports the IAB functionality (e.g., the support of IAB-node from the cell's perspective) and the NPN functionality (e.g., the support of NPN from the cell's perspective) and/or the cell status for the IAB functionality and the NPN functionality.

If the first indication is present (or '1' or {true}), the cell may support the IAB functionality and the NPN functionality and the cell may be considered as a candidate cell for a cell (re)selection procedure from the UE's perspective. That is, the cell may be determined as a candidate cell for IAB-nodes supporting NPN functionality (e.g., an NPN-capable UE supporting IAB). If the first indication is absent (or '0' or {false}), the cell may not support the IAB functionality nor the NPN functionality and/or the cell may be considered as a barred cell for cell (re)selection procedure from the UE's perspective. That is, the cell may be determined as a barred cell for IAB-nodes supporting NPN functionality (e.g., an NPN-capable UE supporting IAB) (or IAB-MT).

If the UE receives the first indication via the system information (e.g., SIB1), the UE may check whether the first indication is associated with the registered (or selected) identity (e.g., PLMN ID, SNPN ID, PNI-NPN ID, NID, CAG ID) identifying the corresponding network (e.g., PLMN, SNPN, PNI-NPN, CAG cell).

If the first indication is not provided (is not present or is absent) in the IE for the selected PLMN, nor the registered PLMN, nor the PLMN of the equivalent PLMN list, nor the selected SNPN, nor the registered SNPN, nor the SNPN of the equivalent SNPN list, the UE may consider the cell as barred (e.g., barred for a UE supporting the TAB functionality and/or the NPN functionality, barred for a UE supporting the TAB functionality and with registered/selected SNPN).

If the first indication is not provided (is not present or is absent) in the IE for the selected (or registered) PNI-NPN (or CAG cell), the UE may consider the cell as barred (e.g., barred for a UE supporting the TAB functionality and the NPN functionality, barred for a UE supporting the TAB functionality and the CAG functionality).

If the first indication is provided (is present or is included) in the IE for the selected (or registered) SNPN, the UE may consider the cell as a candidate cell for a cell (re)selection procedure. The UE may support the IAB functionality and the NPN functionality with registered (or selected) SNPN for the corresponding SNPN.

If the indication is provided (is present or is included) in the IE for the selected (or registered) PLMN/PNI-NPN/CAG, the UE may consider the cell as a candidate cell for a cell (re)selection procedure. The UE may support the IAB functionality and the NPN functionality with registered (or selected) PLMN/PNI-NPN/CAG for the corresponding PNI-NPN/CAG.

If the UE considers itself is barred from a cell, the UE may not consider the cell as a candidate cell for cell (re)selection procedure. If the UE considers itself is not barred from a cell, the UE may consider the cell as a candidate cell for a cell (re)selection procedure.

If the first indication is not related to the UE, the UE may ignore the first indication when the UE receives the first indication. For example, if the UE does not operate as an IAB node, and/or if the UE does not support the IAB functionality, and/or if the UE does not support the NPN functionality, the UE may ignore the first indication.

A UE that supports the IAB functionality and the NPN functionality with registered (or selected) SNPN may not ignore a second indication (e.g., cellReservedforOtherUse IE) broadcast by a cell via the system information (e.g., SIB1) during a cell (re)selection procedure. A UE that supports the IAB functionality and the NPN functionality with registered (or selected) PLMN/PNI-NPN/CAG for PNI-NPN/CAG may not ignore a second indication (e.g., cellReservedforOtherUse IE) broadcast by a cell in the system information (e.g., SIB1) during a cell (re)selection procedure. The format of the second indication may be a Boolean indicator, ENUMERATED {true}, or ENUMERATED {true, false}. The second indication may be associated with all PLMNs whose PLMN IDs are broadcast in the same system information (e.g., SIB1). The second indication and the associated PLMN IDs are broadcast by the cell in the same IE (e.g., cellAccessRelatedInfo IE). The UE may receive the second indication and the associated PLMN IDs via SIB1 broadcast by the cell.

A UE that supports the IAB functionality and the NPN functionality with registered (or selected) SNPN may check the second indication broadcast by a cell and determine whether the cell is barred for the UE or the cell may be a candidate cell for a cell (re)selection procedure.

If the UE receives the second indication that indicates "true" (or "1"), and if the cell does not broadcast any CAG ID or NID, the UE may determine the cell as the cell status is 'barred'.

If the UE receives the second indication that indicates "true" (or "1"), and if the cell broadcasts any CAG ID or NID, the UE may determine whether the UE is barred from the cell based on the first indication. For example, the UE may determine whether the cell is barred for the UE or the cell may be a candidate cell for a cell (re)selection procedure based on the first indication.

If the UE receives the second indication that indicates not "true" (or indicating "0", or indicating "false"), or if the second indication is absent in the IE (e.g., the UE does not receive the second indication, the UE does not receive the IE that includes the second indication), the UE may determine the cell as the cell status is 'barred'.

If the UE receives the second indication that indicates not "true" (or indicating "0", or indicating "false"), or if the second indication is absent in the IE (e.g., the UE does not receive the second indication, the UE does not receive the IE that includes the second indication)), the UE may determine whether the UE is barred from the cell based on the first indication. For example, the UE may determine whether the cell is barred for the UE or the cell may be a candidate cell for a cell (re)selection procedure based on the first indication.

A UE that supports the IAB functionality and the NPN functionality with registered (or selected) PLMN/PNI-NPN/CAG may check the second indication broadcast by a cell and determine whether the cell is barred for the UE or the cell may be a candidate cell for a cell (re)selection procedure.

If the UE receives the second indication that indicates "true" (or "1"), and if the cell does not broadcast any CAG ID or NID, the UE may determine the cell as the cell status is 'barred'.

If the UE receives the second indication that indicating "true" (or "1"), and if the cell broadcasts any CAG ID or NID, the UE may determine whether the UE is barred from the cell based on the first indication. For example, the UE may determine whether the cell is barred for the UE or the cell may be a candidate cell for a cell (re)selection procedure based on the first indication.

If the UE receives the second indication that indicates not "true" (or indicating "0", or indicating "false"), or if the second indication is absent in the IE (e.g., the UE does not receive the second indication, the UE does not receive the IE that includes the second indication), the UE may determine the cell as the cell status is 'barred'.

If the UE receives the second indication that indicates "true" (or indicating "0", or indicating "false"), or if the second indication is absent in the IE (e.g., the UE does not receive the second indication), the UE may determine whether the UE is barred from the cell based on the first indication. For example, the UE may determine whether the cell is barred for the UE or the cell may be a candidate cell for a cell (re)selection procedure based on the first indication.

UE Operating as an IAB-Node

A UE that supports the IAB functionality may refer to a UE operating as an IAB node. Alternatively, a UE that supports the IAB functionality may determine by itself (or be determined by the network (NW)) to be a UE operating as an IAB node. A UE that supports the IAB functionality may determine by itself (or be determined by the NW) not to be a UE operating as an IAB node. For example, the previously mentioned examples (e.g., the first indication, the second indication, the cell (re)selection procedure) may be applied to the IAB node.

The NAS entity of the UE that supports the IAB functionality may send a third indication to the AS entity of the UE. If the AS entity of the UE receives the third indication, the AS entity of the UE may determine itself as a UE operating as an IAB node based on (the reception of) the third indication.

The NAS entity of the UE that supports the IAB functionality may send a third indication to the AS entity of the UE. If the third indication is '1', the AS entity of the UE may determine itself as a UE operating as an IAB node based on (the content of) the third indication after receiving the third indication.

The NAS entity of the UE that supports the IAB functionality may send a third indication to the AS entity of the UE. If the third indication is '0', the AS entity of the UE may determine itself not to be a UE operating as an IAB node based on (the content of) the third indication after receiving the third indication.

The network may transmit a third indication to (the AS entity of) the UE. If (the AS entity of) the UE receives the third indication, the UE that supports the IAB functionality may determine itself as a UE operating as an IAB node based on (the reception of) the third indication.

The network may transmit a third indication in downlink control information (DCI)/Medium Access Control (MAC) Control Element (CE)/RRC message to (the AS entity of) the UE. If (the AS entity of) the UE receives the third indication and the third indication is '1', the UE that supports the IAB functionality may determine itself as a UE operating as an IAB node based on (the content of) the third indication.

The network may transmit a third indication in DCI/MAC CE/RRC message to (the AS entity of) the UE. If (the AS entity of) the UE receives the third indication and the third indication is '0', the UE that supports the IAB functionality may determine itself not to be a UE operating as an IAB node based on (the content of) the third indication.

The third indication may be associated with a PLMN/SNPN/PNI-NPN/CAG and/or a RAT (e.g., NR, E-UTRA). The UE may determine itself whether to be a UE operating as an IAB node based on the third indication (e.g., the reception of the third indication, the content of the third indication) and/or based on the (registered/selected) PLMN/SNPN/PNI-NPN/CAG and/or based on the RAT that the UE operates/selects.

The third indication may be associated with a PLMN/SNPN/PNI-NPN/CAG. The associated PLMN/SNPN/PNI- NPN/CAG may be predefined (or preconfigured) in the Universal Subscriber Identity Module (USIM) or by the network.

For example, the NAS entity of the UE that supports the IAB functionality may send a third indication associated with at least a PLMN/SNPN/PNI-NPN/CAG to the AS entity of the UE.

For example, the UE may perform as an IAB node (for the associated PLMN/SNPN/PNI-NPN/CAG) (1) after the AS entity of the UE receives the third indication, (2) if the received third indication associated with a PLMN/SNPN/PNI-NPN/CAG that is the registered/selected PLMN/SNPN/PNI-NPN/CAG of the UE, and/or (3) if the content of the third indication is '1'.

The third indication may be associated with a RAT. The associated RAT may be predefined (or preconfigured) in the USIM or by the network.

For example, the NAS entity of the UE that supports the IAB functionality may send a third indication associated with at least one RAT to the AS entity of the UE.

For example, the UE may perform as an IAB node (for the associated RAT) (1) after the AS entity of the UE receives the third indication, (2) if the received third indication associated with a RAT that is the RAT selected/instructed by the NAS entity of the UE to perform PLMN selection and/or cell (re)selection, and/or (3) if the content of the third indication is '1'.

The terms, such as NW, RAN, cell, camped cell, serving cell, BS, gNB, eNB and ng-eNB are used interchangeably. Some of these terms may refer to the same network entity.

A serving cell may represent, for a UE in RRC_CONNECTED state not configured with carrier aggregation (CA) or dual connectivity (DC), the primary cell. For a UE in RRC_CONNECTED state configured with CA/DC, the term "serving cells" is used to denote a set of cells comprising the Special Cell(s) and all secondary cells.

The term "Special Cell" may refer to the PCell of the MCG or the PSCell of the SCG, for the DC operation. Otherwise, the term "Special Cell" may refer to the PCell.

The previously mentioned examples may be applied to any RAT. The RAT may be (but may not be limited to) NR, NR-U (NR-Unlicensed, NR-based access to unlicensed spectrum), LTE, E-UTRA connected to 5GC, LTE connected to 5GC, E-UTRA connected to EPC, and LTE connected to EPC.

The previously mentioned examples may be applied to the UEs in public networks or in private networks (e.g., non-public network (NPN), standalone NPN (SNPN), or public network integrated NPN (PNI-NPN)).

The previously mentioned examples may be used for licensed frequency and/or unlicensed frequency.

System information (SI) may refer to MIB, SIB1, and other SI. Minimum SI may include MIB and SIB1. Other SI may refer to SIB3, SIB4, SIB5, and other SIB(s) (e.g., SNPN-specific SIB or PNI-NPN-specific SIB).

Dedicated signaling may refer to (but may not be limited to) RRC message(s). For example, the RRC message may include an RRC (Connection) Setup Request message, RRC (Connection) Setup message, RRC (Connection) Setup Complete message, RRC (Connection) Reconfiguration message, RRC Connection Reconfiguration message including the mobility control information, RRC Connection Reconfiguration message without the mobility control information inside, RRC Reconfiguration message including the configuration with sync, RRC Reconfiguration message without the configuration with sync inside, RRC (Connection) Reconfiguration complete message, RRC (Connection) Resume Request message, RRC (Connection) Resume message, RRC (Connection) Resume Complete message, RRC (Connection) Reestablishment Request message, RRC (Connection) Reestablishment message, RRC (Connection) Reestablishment Complete message, RRC (Connection) Reject message, RRC (Connection) Release message, RRC System Information Request message, UE Assistance Information message, UE Capability Enquiry message, and UE Capability Information message. RRC message may be one kind of dedicated signaling. The UE may receive the RRC message from the network via unicast/broadcast/groupcast.

The RRC_CONNECTED UE, RRC_INACTIVE UE, and RRC_IDLE UE may apply the previously mentioned examples.

An RRC_CONNECTED UE may be configured with an active BWP with a common search space configured to monitor system information or paging.

Generally, the previously mentioned examples may be applied to the PCell and the UE. The previously mentioned examples may be applied to the PSCell and the UE. A short message and/or a paging downlink control information (DCI) may be transmitted by the PSCell (or a secondary node) to the UE. The UE may monitor the Physical Downlink Control Channel (PDCCH) monitoring occasions for the paging configured by the PSCell (or a secondary node).

An allowed CAG list may represent a per-PLMN list of CAG identifiers that the UE is allowed to access.

A CAG cell may refer to the cell broadcasting at least one CAG identifier.

A CAG may represent CAG(s) operating nearby cells, and the CAG(s) may be identified by the CAG ID(s) broadcast by the nearby cells.

A CAG member cell may represent, for a UE, the cell broadcasting an identity of the selected PLMN, registered PLMN, or equivalent PLMN, and for that PLMN, a CAG identifier belonging to the allowed CAG list of the UE for that PLMN.

A CAG identifier may be used for identifying a CAG within a PLMN.

A network identifier may be used for identifying an SNPN in combination with a PLMN ID.

An NPN may refer to the network deployed for a non-public usage.

An NPN-only cell may refer to the cell that is only available for normal services for the NPN's subscribers. An NPN-capable UE determines that a cell is an NPN-only cell by detecting that the cellReservedForOtherUse IE is set to be true while the npn-IdentityInfoList IE is present in CellAccessRelatedInfo IE.

A PNI-NPN ID may represent the identifier of a PNI-NPN comprising a PLMN ID and a CAG ID combination.

A registered SNPN may refer to the SNPN on which certain location registration outcomes have occurred.

A selected SNPN may refer to the SNPN that has been selected by the NAS (e.g., the NAS layer of the UE, or the NAS layer of the CN), either manually or automatically.

An SNPN access mode may represent the mode of operation where the UE only selects SNPNs.

An SNPN identity may represent the identifier of an SNPN comprising a PLMN ID and an NID combination.

An SNPN-only cell may refer to the cell that is only available for normal services for SNPN subscribers.

An NPN-capable UE may refer to the UE supporting CAG (or NPN).

A child node may represent the next hop neighbor node of the IAB-node-DU, where the child node is also an IAB-node.

A parent node may represent the next hop neighbor node of the IAB-node-MT, where the parent node can be an IAB-node or the IAB-donor-DU.

Downstream may represent the direction toward the child node or the UE in the IAB-topology.

Upstream may represent the direction toward the parent node in the IAB-topology.

An IAB-donor may represent the gNB that provides network access to UEs via a network of backhaul and access links.

An IAB-DU may represent the gNB-DU functionality supported by the IAB-node to terminate the NR access interface to UEs and next-hop IAB-nodes, and to terminate the F1 protocol to the gNB-CU functionality, as defined in the 3GPP TS 38.401 v16.1.0, of the IAB-donor.

An IAB-MT may represent the IAB-node function that terminates the Uu interface to the parent node applying the procedures and behaviors specified for UEs. IAB-MT function used in the 38 series of the 3GPP Specifications corresponds to IAB-UE function defined in the 3GPP TS 23.501 v16.4.0.

An IAB-node may represent the RAN node that supports NR access links to UEs and NR backhaul links to the parent nodes and the child nodes. The IAB-node may or may not support backhauling via LTE.

Multi-hop backhauling may use a chain of NR (and/or LTE) backhaul links between an IAB-node and an IAB-donor-gNB.

An NR backhaul link may represent the NR link used for backhauling between an IAB-node and an IAB-donor-gNB, and between IAB-nodes in case of a multi-hop backhauling.

An LTE backhaul link may represent the LTE link used for backhauling between an IAB-node and an IAB-donor-gNB, and between IAB-nodes in case of a multi-hop backhauling.

Multi-Radio Dual Connectivity (MR-DC) may represent the dual connectivity between E-UTRA and NR nodes, or between two NR nodes. MR-DC may include EN-DC, NE-DC, NGEN-DC, and NR-DC mode.

A Master Cell Group may represent, in MR-DC, the group of serving cells associated with the Master Node (MN) comprising the SpCell (PCell) and optionally one or more SCells.

A master node may represent, in MR-DC, the radio access node that provides the control plane connection to the core network. It may be a Master eNB (in EN-DC mode), a Master ng-eNB (in NGEN-DC mode) or a Master gNB (in NR-DC and NE-DC mode).

A Secondary Cell Group may represent, in MR-DC, the group of serving cells associated with the Secondary Node (SN) comprising the SpCell (PSCell) and optionally one or more SCells.

A secondary node may represent, in MR-DC, the radio access node, with no control plane connection to the core network, providing additional resources to the UE. It may be an en-gNB (in EN-DC mode), a Secondary ng-eNB (in NE-DC mode) or a Secondary gNB (in NR-DC and NGEN-DC mode).

An MeNB may refer to the Master eNB that is an eNB as a master node associated with an MCG in the MR-DC mode.

An SgNB may refer to the Secondary gNB that is a gNB as a secondary node associated with an SCG in MR-DC mode.

The first indication may be associated with NR, LTE connected to EPC, and/or LTE connected to 5GC. The second indication may be associated with NR, LTE connected to EPC, and/or LTE connected to 5GC. The first indication and the second indication may be associated with the same RAT (e.g., NR, LTE connected to EPC, LTE connected to 5GC) or different RATs. The UE supporting one RAT (e.g., IAB functionality via NR and/or NPN functionality via NR, if the one RAT is NR) may apply the first indication associated with NR and/or the second indication associated with NR. The UE supporting the one RAT may apply or ignore the first indication that is not associated with NR and/or the second indication that is not associated with NR.

In the previously mentioned examples, if the UE considers itself barred by a cell or if the UE bars a cell, the UE may bar the cell for a period of time (e.g., 300 s). In other words, the UE may not consider the cell as a candidate cell for cell (re)selectin for a period of time (e.g., 300 s).

In the previously mentioned examples, if the UE changes from the SNPN access mode to the PLMN access mode (i.e., the UE leaves the SNPN access mode and operates not in SNPN access mode), (the NAS entity of) the UE may release (or delete or discard) the (stored or maintained) list of SNPN ID(s).

In the previously mentioned examples, if the UE changes from the PLMN access mode to the SNPN access mode (i.e., the UE enters the SNPN access mode from a state that the UE does not operate in SNPN access mode), (the NAS entity of) the UE may release (or delete or discard) the (stored or maintained) list of PLMN ID(s).

DCI may refer to a PDCCH resource with Cyclic Redundancy Check (CRC) scrambled by a Radio Network Temporary Identifier (RNTI). The RNTI may relate to IAB. Alternatively, the examples regarding the DCI may be applied for a physical signal.

A MAC CE is a bit string that is byte aligned (i.e., multiple of 8 bits) in length.

In the previously mentioned examples, if the UE that supports the IAB functionality determines itself to be an IAB node or operate as an IAB node, and/or if the UE performs as the IAB node, and/or if the UE operates the IAB functions, the UE may transmit an indication to inform the network via dedicated signaling.

Figure 3:
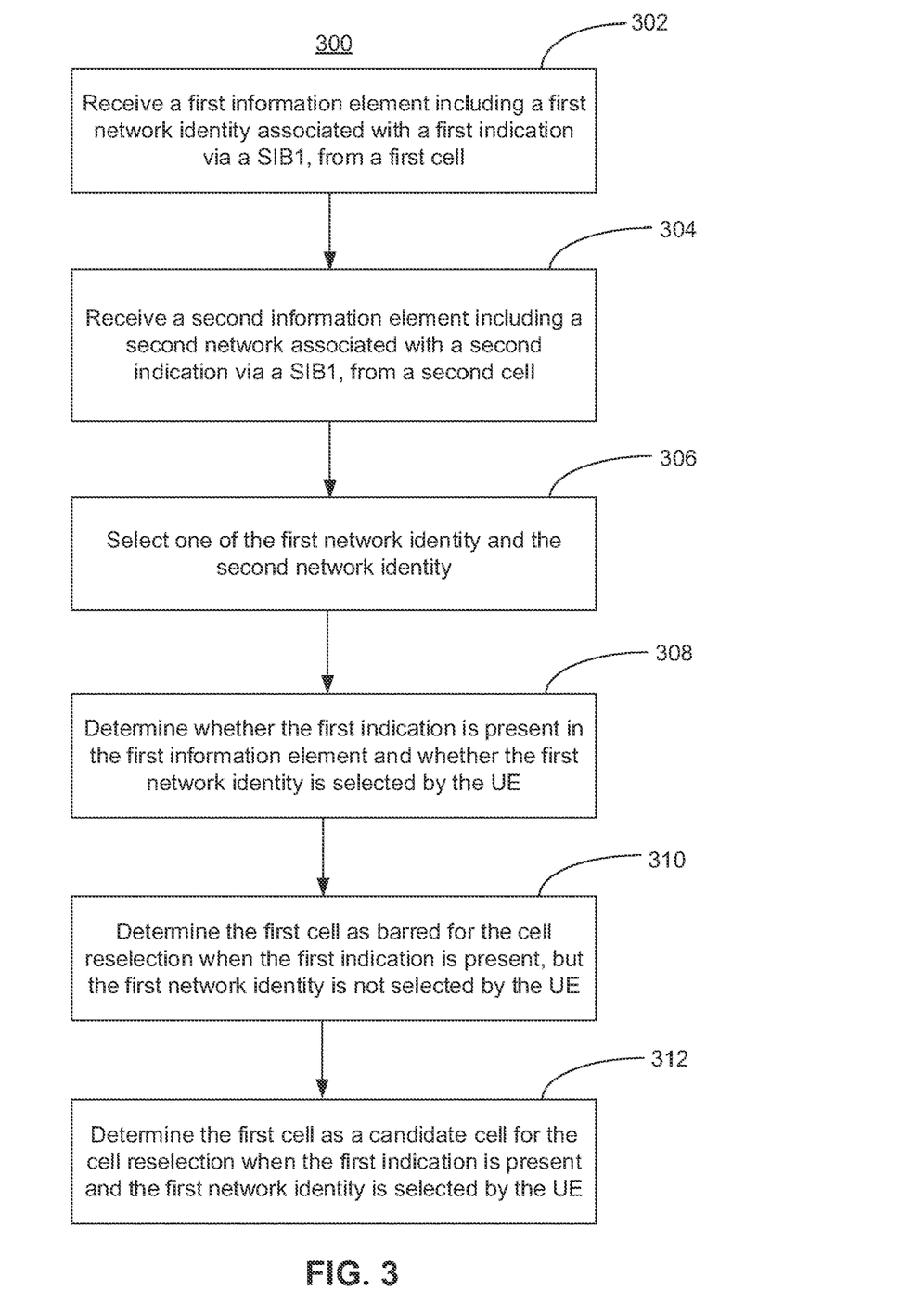
FIG. 3 is a flowchart illustrating a method of cell reselection performed by a UE in a non-public network (NPN), according to an implementation of the present disclosure.

FIG. 3 is a flowchart illustrating a method 300 for a UE to perform a cell reselection in an NPN. In action 302, the UE receives a first information element (e.g., NPN-IdentityInfo IE) including a first network identity (e.g., an SNPN ID or a PNI-NPN ID) associated with a first indication (e.g., iab-Support IE) via a SIB1, from a first cell. In action 304, the UE receives a second information element including a second network (e.g., a PLMN ID) associated with a second indication via a SIB1, from a second cell. In action 306, the UE selects one of the first network identity and the second network identity. In action 308, the UE determines whether the first indication is present in the first information element and whether the first network identity is selected by the UE. In action 310, the UE determines the first cell as barred for the cell reselection when the first indication is present, but the first network identity is not selected by the UE. In action 312, the UE determines the first cell as a candidate cell for the cell reselection when the first indication is present and the first network identity is selected by the UE.

In one example, the first indication is used for indicating whether the first cell supports the IAB functionality.

In one example, the first network identity is an NPN identity that may be an SNPN ID or a PNI-NPN ID. The second network identity is a PLMN ID. It is noted that the first network identity is different from the second network identity.

In one example, the UE determines the first cell as barred for the cell reselection when the first indication is absent (or is not present) in the first information element.

In one example, the UE determines the first cell as barred for the cell reselection when the UE selects the first network identity, but the first indication is absent (or is not present) in the first information element.

In one example, the UE supports the IAB functionality.

In one example, the NAS layer of the UE transmits the previously mentioned third indication indicating the UE supports the IAB functionality, to the AS layer of the UE, and thus the AS layer of the UE determines that the UE supports the IAB functionality when the AS layer of the UE receives the third indication from the NAS layer of the UE.

In one example, the third indication is associated with a third network identity that may be a PLMN ID, an SNPN ID, a PNI-NPN ID, a CAG ID or an NID.

In one example, the first indication indicates the first cell supports the IAB functionality when the first indication is present in the first information element.

In one example, the UE ignores the first indication associated with the first network identity when the UE does not support the IAB functionality.

In one example, the UE ignores the second indication associated with the second network identity when the UE does not select the second network identity.

In one example, the first indication indicates the first cell supports the IAB functionality when the first indication is present in the first information element and is configured with a first value (e.g., '1' or {true}).

Figure 4:
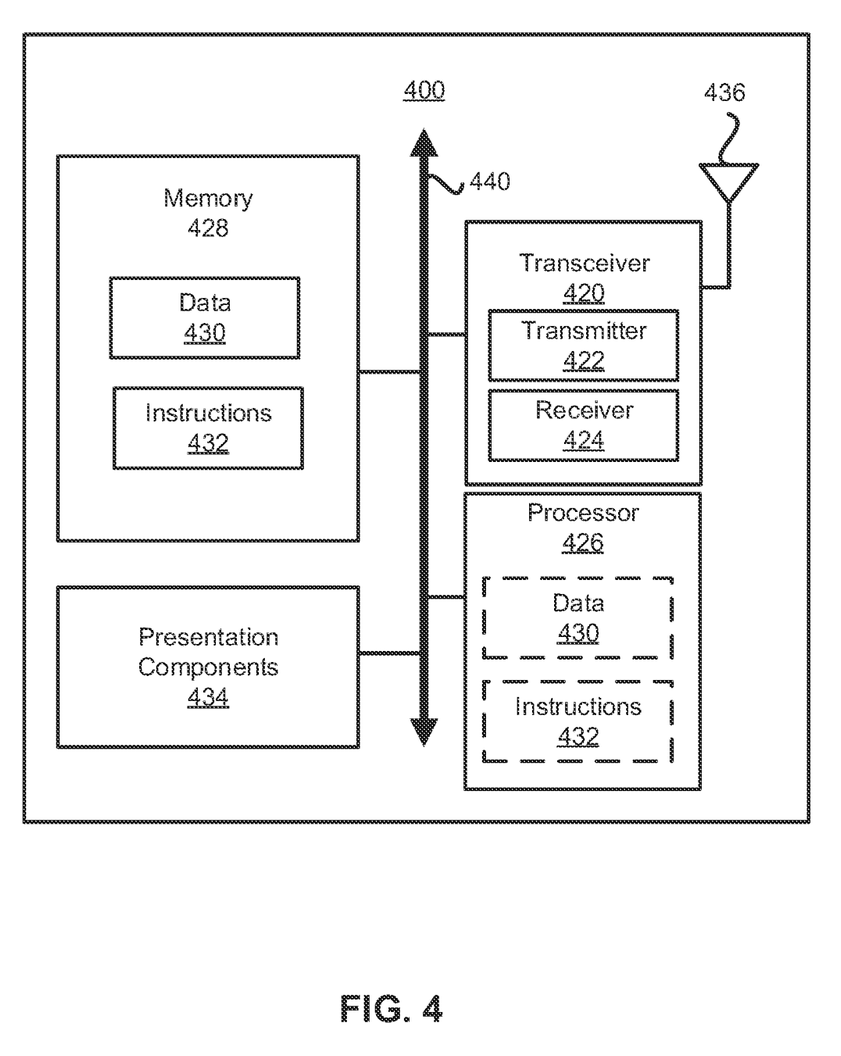
FIG. 4 is a block diagram illustrating a node for wireless communication, according to an implementation of the present disclosure.

FIG. 4 is a block diagram illustrating a node 400 for wireless communication, according to an implementation of the present disclosure.

As illustrated in FIG. 4, the node 400 may include a transceiver 420, a processor 426, a memory 428, one or more presentation components 434, and at least one antenna 436. The node 400 may also include a Radio Frequency (RF) spectrum band module, a BS communications module, a network communications module, a system communications management module, input/output (I/O) ports, I/O components, and a power supply (not illustrated in FIG. 4).

Each of these components may be in communication with each other, directly or indirectly, over one or more buses 440. The node 400 may be a UE or a BS that performs various disclosed functions illustrated in FIG. 3 and examples in this disclosure.

The transceiver 420 may include a transmitter 422 (with transmitting circuitry) and a receiver 424 (with receiving circuitry) and may be configured to transmit and/or receive time and/or frequency resource partitioning information. The transceiver 420 may be configured to transmit in different types of subframes and slots including, but not limited to, usable, non-usable and flexibly usable subframes and slot formats. The transceiver 420 may be configured to receive data and control channels.

The node 400 may include a variety of computer-readable media. Computer-readable media may be any media that can be accessed by the node 400 and include both volatile (and non-volatile) media and removable (and non-removable) media. Computer-readable media may include computer storage media and communication media. Computer storage media may include both volatile (and/or non-volatile), as well as removable (and/or non-removable), media implemented according to any method or technology for storage of information such as computer-readable media.

Computer storage media may include RAM, ROM, EPROM, EEPROM, flash memory (or other memory technology), CD-ROM, Digital Versatile Disk (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal such as a carrier wave or other transport mechanisms and include any information delivery media. The term "modulated data signal" may mean a signal that has one or more of its characteristics set or changed in such a manner as to encode information in the signal. Communication media may include wired media such as a wired network or direct-wired connection, and wireless media such as acoustic, RF, infrared, and other wireless media. Combinations of any of the disclosed media should be included within the scope of computer-readable media.

The memory 428 may include computer-storage media in the form of volatile and/or non-volatile memory. The memory 428 may be removable, non-removable, or a combination thereof. For example, the memory 428 may include solid-state memory, hard drives, optical-disc drives, etc. As illustrated in FIG. 4, the memory 428 may store computer-readable and/or computer-executable instructions 432 (e.g., software codes) that are configured to, when executed, cause the processor 426 (e.g., processing circuitry) to perform various disclosed functions. Alternatively, the instructions 432 may not be directly executable by the processor 426 but may be configured to cause the node 400 (e.g., when compiled and executed) to perform various disclosed functions.

The processor 426 may include an intelligent hardware device, a central processing unit (CPU), a microcontroller, an ASIC, etc. The processor 426 may include memory. The processor 426 may process the data 430 and the instructions 432 received from the memory 428, and information received through the transceiver 420, the baseband communications module, and/or the network communications module. The processor 426 may also process information to be sent to the transceiver 420 for transmission via the antenna 436, and/or to the network communications module for transmission to a CN.

One or more presentation components 434 may present data to a person or other devices. Presentation components 434 may include a display device, a speaker, a printing component, a vibrating component, etc.

From the present disclosure, it is evident that various techniques can be utilized for implementing the disclosed concepts without departing from the scope of those concepts. Moreover, while the concepts have been disclosed with specific reference to specific implementations, a person of ordinary skill in the art would recognize that changes can be made in form and detail without departing from the scope of those concepts. As such, the present disclosure is to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method performed by a user equipment (UE) for cell reselection in a non-public network (NPN), the method comprising:

receiving, from a first cell via a first System Information Block 1 (SIB1), a first information element including a first network identity associated with a first indication;
receiving, from a second cell via a second SIB1, a second information element including a second network identity associated with a second indication;
selecting one of the first network identity and the second network identity;
determining whether the first indication is present in the first information element and whether the first network identity is selected by the UE;
determining the first cell as barred for the cell reselection when the first indication is present, but the first network identity is not selected by the UE; and
determining the first cell as a candidate cell for the cell reselection when the first indication is present and the first network identity is selected by the UE,
wherein:
the first indication indicates whether the first cell supports integrated access and backhaul (IAB) functionality, and
the first network identity is different from the second network identity.

2. The method of claim 1, further comprising:
determining the first cell as barred for the cell reselection when the first indication is absent in the first information element.

3. The method of claim 1, wherein:
the first network identity is an NPN identity including a single non-public network (SNPN) identity and a public network integrated non-public network (PNI-NPN) identity, and
the second network identity is a public land mobile network (PLMN) identity.

4. The method of claim 1, wherein the UE supports the IAB functionality.

5. The method of claim 1, further comprising:
transmitting, by a Non-Access Stratum (NAS) layer of the UE, to an Access Stratum (AS) layer of the UE, a third indication indicating that the UE supports the JAB functionality; and
determining, by the AS layer of the UE, that the UE supports the JAB functionality when receiving the third indication from the NAS layer of the UE.

6. The method of claim 5, wherein the third indication is associated with a third network identity including a public land mobile network (PLMN) identity, a single non-public network (SNPN) identity, a public network integrated non-public network (PNI-NPN) identity, a closed access group (CAG) identity, and a network identifier (ND).

7. The method of claim 1, wherein the first indication indicates that the first cell supports the JAB functionality when the first indication is present.

8. The method of claim 1, further comprising:
ignoring the first indication when the UE does not support the JAB functionality.

9. The method of claim 1, further comprising:
ignoring the second indication when the second network identity is not selected by the UE.

10. The method of claim 1, wherein the first indication indicates that the first cell supports the JAB functionality when the first indication is present and is configured with a first value.

11. A user equipment (UE) for performing a cell reselection in a non-public network (NPN), the UE comprising:
at least one processor for executing computer-executable instructions; and
at least one memory coupled to the at least one processor for storing the computer-executable instructions, wherein the computer-executable instructions, when executed by the at least one processor, instruct the UE to:
receive, from a first cell via a first System Information Block 1 (SIB1), a first information element including a first network identity associated with a first indication;
receive, from a second cell via a second SIB1, a second information element including a second network identity associated with a second indication;
select one of the first network identity and the second network identity;
determine whether the first indication is present in the first information element and whether the first network identity is selected by the UE;
determine the first cell as barred for the cell reselection when the first indication is present, but the first network identity is not selected by the UE; and
determine the first cell as a candidate cell for the cell reselection when the first indication is present and the first network identity is selected by the UE,
wherein:
the first indication indicates whether the first cell supports integrated access and backhaul (IAB) functionality, and
the first network identity is different from the second network identity.

12. The UE of claim 11, wherein the computer-executable instructions, when executed by the at least one processor, further instruct the UE to:
determine the first cell as barred for the cell reselection when the first indication is absent in the first information element.

13. The UE of claim 11, wherein the first network identity is an NPN identity including a single non-public network (SNPN) identity and a public network integrated non-public network (PNI-NPN) identity, and the second network identity is a public land mobile network (PLMN) identity, wherein:
the first network identity is an NPN identity including a single non-public network (SNPN) identity and a public network integrated non-public network (PNI-NPN) identity, and
the second network identity is a public land mobile network (PLMN) identity.

14. The UE of claim 11, wherein the UE supports the IAB functionality.

15. The UE of claim 11, wherein the computer-executable instructions, when executed by the at least one processor, further instruct the UE to:
transmit, by a Non-Access Stratum (NAS) layer of the UE, to an Access Stratum (AS) layer of the UE, a third indication indicating that the UE supports the IAB functionality; and
determine, by the AS layer of the UE, that the UE supports the IAB functionality when receiving the third indication from the NAS layer of the UE.

16. The UE of claim 15, wherein the third indication is associated with a third network identity including a public land mobile network (PLMN) identity, a single non-public network (SNPN) identity, a public network integrated non-public network (PNI-NPN) identity, a closed access group (CAG) identity, and a network identifier (NID).

17. The UE of claim 11, wherein the first indication indicates that the first cell supports the IAB functionality when the first indication is present.

18. The UE of claim 11, wherein the computer-executable instructions, when executed by the at least one processor, further instruct the UE to:
ignore the first indication when the UE does not support the IAB functionality.

19. The UE of claim 11, wherein the computer-executable instructions, when executed by the at least one processor, further instruct the UE to:
ignore the second indication when the second network identity is not selected by the UE.

20. The UE of claim 11, wherein the first indication indicates the first cell supports the IAB functionality when the first indication is present and is configured with a first value.

* * * * *